United States Patent Office 3,392,969
Patented July 16, 1968

3,392,969
INSTALLATION AND METHOD FOR FIRING MATERIALS SUCH AS LIMESTONE
Franz Müller, Bensberg-Refrath, Germany, assignor to Klockner-Humboldt-Deutz Aktiengesellschaft, Cologne-Deutz, Germany, a corporation of Germany
Filed Aug. 5, 1966, Ser. No. 570,502
Claims priority, application Germany, Aug. 19, 1965, K 56,926
1 Claim. (Cl. 263—29)

ABSTRACT OF THE DISCLOSURE

In an installation for firing materials, such as an apparatus for calcining limestone, there are elongated shaft furnace means having an upper inlet end through which material to be treated is charged into the furnace means and a lower outlet end through which treated material is withdrawn from the furnace means, the furnace means being formed at an upper region but at an elevation lower than the inlet end thereof with a gas inlet and also being formed at an elevation lower than the gas inlet but higher than the outlet end with a gas outlet, combustion chamber means situated at the exterior of the furnace means for providing hot combustion gases, supply conduit means communicating with the combustion chamber means and the gas inlet of the furnace means for supplying hot combustion gases to the interior of the furnace means from the combustion chamber means, return conduit means communicating with the gas outlet of the furnace means and with the combustion chamber means for returning gases from the furnace means to the combustion chamber means, blower means operatively connected with the return conduit means for withdrawing gases from the interior of the furnace means through the gas outlet and for directing the thus-withdrawn gases along the return conduit means back to the combustion chamber means, the shaft furnace means being formed with an additional gas outlet situated below the first-mentioned gas outlet but above the lower outlet end of the furnace means, an additional return conduit means communicating with the additional gas outlet and the combustion chamber means, and an additional blower means coacting with the additional return conduit means for withdrawing gas from the interior of the furnace means through the additional gas outlet and directing the latter gas back to the combustion chamber means along the additional return conduit means.

My invention relates to a method and installation for firing materials, such as a method and installation for calcining limestone.

As is known, a material such as limestone can be calcined or fired in a shaft furnace in which the calcining is carried out by means of hot gases of combustion derived from a combustion chamber and introduced into the shaft furnace.

It is conventional with methods and apparatus of the above type to direct the hot gases upwardly along the interior of the furnace in countercurrent to the downward movement of the material which is treated in the furnace with the hot gases, so that the latter flow upwardly as the treated material flows downwardly. As a result there will be provided in the shaft furnace directly over the location where the hot gases are introduced into the furnace a calcining of the limestone, and at this region above the location where the gas is introduced the treated material is heated. Inasmuch as the hot gases which flow upwardly along the interior of the shaft furnace cool off rapidly by engaging the treated material, the distance through which actual calcining takes place extends along a relatively short zone of the furnace. As a result, the calcining of particles, particularly particles of relatively large size, requires a relatively long period of time at the conventional temperatures of approximately 1000°–1200° C., and therefore the material which is treated necessarily moves very slowly through the furnace. The result is, of necessity, a low output. It is only possible to increase the output by using in the furnace combustion gases of higher temperatures, for example a temperature of more than 1200° C. However, when resorting to such an expedient there is the danger that there will be formed on the limestone an outer crust which is not gas-permeable and which will thus prevent a complete deacidification and thus will also prevent a complete calcining. The result is not only a reduction in the quantity of the fired limestone, but also a small yield results.

It is, therefore, a primary object of my invention to provide an installation and method of the above general type which will permit the above disadvantages to be avoided.

In particular, it is an object of my invention to provide an installation and method which will enable the time during which reaction of the hot gases with the limestone takes place to be substantially increased, as compared to conventional methods and installations, without, however, reducing the output.

Thus, it is also an object of the present invention to provide an installation and method of the above general type which will permit the firing to take place at a temperature of, for example, less than approximately 1200° C.

Thus, it is an object of my invention to provide a method and apparatus of the above general type which will provide a high output of fully calcined limestone of significantly higher quality than has heretofore been possible to achieve from conventional methods and apparatus of comparable size.

It is a further object of my invention to provide a method and installation of the above general type which will make it possible to introduce into the shaft furnace a sufficient amount of hot combustion gases to carry out the required firing while at the same time making it possible to burn at a combustion chamber means from which the hot combustion gas is derived a relatively small amount of fuel, so that it becomes possible with the method and apparatus of my invention to provide a sufficient amount of hot gas at the required temperature from combustion of a relatively small amount of fuel.

It is furthermore an object of my invention to provide a method and installation of the above type which will deliver from the shaft furance fired limestone which has been cooled to such a low temperature that without any further cooling it is possible to transport the treated material away from the furnace.

With the method and apparatus of my invention, the shaft furnace has an upper inlet end through which the material to be treated is introduced and a lower outlet end through which the treated material is withdrawn, and in an upper region but at an elevation below the upper inlet end the shaft furnace of my invention is formed with a gas inlet while at an elevation below the gas inlet the furnace of my invention is formed with the gas outlet. In accordance with the method and apparatus of my invention hot combustion gases derived from a suitable combustion chamber means are introduced into the furnace through the gas inlet and part of these gases are directed upwardly toward the upper inlet end of the furnace means in countercurrent to the downwardly moving material while another part of the thus-introduced combustion gases is directed downwardly along the interior of the furnace concurrently with the downwardly moving material, so that in this way there is a considerable increase in the time during which the hot combustion gases remain in contact with the material to be treated. The hot combustion gases are supplied to the gas inlet from the combustion chamber means through a suitable supply conduit means, while a return conduit means communicates with the gas outlet of the furnace means of my invention to direct gases back to the combustion chamber means from the furnace means, and a blower means communicates with the return conduit means to withdraw gases from the interior of the furnace through the gas outlet and to direct the withdrawn gases back along the return conduit means to the combustion chamber means.

My invention is illustrated by way of example in the accompanying drawings which form part of this application and in which.

Figure 1:
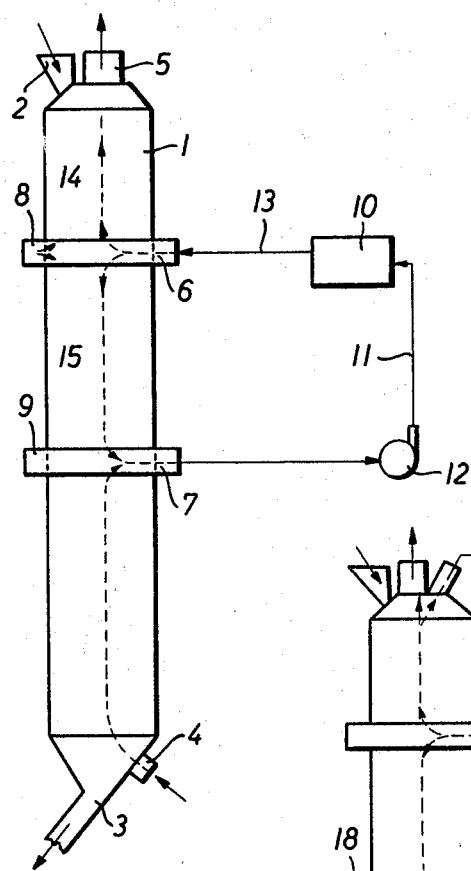
FIG. 1 is a schematic illustration of one possible method and apparatus according to my invention.

Referring now to FIG. 1, the shaft furnace 1 which is schematically illustrated therein has an upper inlet end provided with an inlet 2 through which the material to be treated is introduced, and the shaft furnace means 1 of my invention has a lower outlet end 3 from which the treated material is discharged. The shaft furnace means 1 of my invention is formed with an air inlet 4 at a lower end portion of the shaft furnace means, and through this air inlet 4 cool air is introduced into the shaft furnace, this cool air entering into the shaft furnace 1 at the same region where the lower outlet end 3 for the treated material is located. At the upper inlet end of the shaft furnace means 1 is situated a gas outlet 5.

The shaft furnace means 1 of my invention is formed at an upper portion below the inlet end thereof with a gas inlet 6, and at an elevation lower than the gas inlet 6 the shaft furnace means 1 is formed with a gas outlet 7. For this purpose the wall of the shaft furnace is formed around its entire circumference with a plurality of gas inlet openings 6 situated at the elevation indicated for the openings 6 in FIG. 1, and in the same way the shaft furnace 1 is formed around its entire circumference with openings 7 which form gas outlets. A hollow annular channel member 8 is fixed to the outer surface of the shaft furnace means and has its hollow interior communicating with the gas inlet openings 6, so that the latter can communicate with the interior of the channel 8 but not with the outer atmosphere, and in the same way a hollow annular channel 9 is fluid-tightly fixed to the exterior surface of the furnace 1 surrounding the latter and having its interior communicating with the openings 7, so that the gas outlet openings 7 are capable of communicating with the interior of the channel 9 but not with the outer atmosphere.

A combustion chamber means 10 is situated outside of the shaft furnace means 1, and this combustion chamber means 10 is in the form of any suitable enclosure provided in its interior with suitable structure for burning a mixture of fuel and air. A return conduit means 11 communicates at one end with the interior of the channel 9 and at its opposite end with the combustion chamber means 10, for directing to the latter gas withdrawn from the interior of the furnace through the gas outlets 7. A blower 12 coacts with the return conduit means 11 to withdraw gas from the interior of the furnace through the openings 7 and to introduce this withdrawn gas into the combustion chamber means 10 in the manner shown schematically in FIG. 1. A supply conduit means 13 communicates with the combustion chamber means 10 to receive the hot combustion gases therefrom and this supply conduit means 13 communicates with the channel 8 so as to communicate at the interior of the latter with the gas inlet openings 6, and in this way hot combustion gases are introduced into the interior of the shaft furnace means 1.

During operation, the combustion gases which are derived from the combustion chamber 10 flow at a temperature of approximately 1200° C. through the supply conduit means 13 into the annular channel 8 from where this gas flows through the passages 6 in the wall of the shaft furnace into the interior of the latter. In the interior of the shaft furnace there is a division of the gas which is introduced in this way, this division of the gas being indicated in dotted lines in the drawing. Thus, a part of the gas introduced into the furnace flows upwardly in countercurrent to the downwardly moving material which is to be treated, and another part of the gas which is introduced into the furnace through the gas inlets 6 flows downwardly along the interior of the furnace concurrently with the material to be treated. The parts are designed in such a way that at the region of the gas inlet openings 6 the total gas introduced will be divided so that up to approximately two thirds will be directed upwardly along the interior of the furnace while the remainder of the gas will flow downwardly along the interior of the furnace. As a result of this distribution of the introduced hot gases, the upper and intermediate regions of the shaft furnace are for practical purposes divided into two zones, namely an upper zone 14 and a lower zone 15. In the zone 14 the countercurrent relationship between the gases and materials takes place, and in this way there will be produced in the upper zone 14 a preliminary calcining or a preliminary deacidification of the limestone which is introduced into the shaft furnace. The gas which flows out of the upper zone 14 at the top end of the furnace is released to the outer atmosphere through the outlet 5.

In the zone 15 where the gas flows concurrently with the treated material, the remainder of the calcining of the limestone takes place, and the concurrently flowing gases are withdrawn by means of the blower 12 from the interior of the furnace at an elevation lower than the elevation where the gases are initially introduced into the furnace, these withdrawn gases being returned to the combustion chamber means 10. At the same time, the blower means 12 serve to draw into the furnace cooling air which flows into the furnace through the lower inlet 4, and this cooling air combines with the gas from the zone 15 to be supplied in the form of preheated combustion air to the combustion chamber means 10.

As a result of the distribution of the hot combustion gases in the furnace, in accordance with my invention, the time during which the gases act on the material to be treated, particularly in the lower primary calcining zone, is extended so that the calcining of the limestone can be carried out at relatively low temperatures. Therefore, a complete calcining of the limestone is possible and in contrast with conventional methods a high output of the furnace can be achieved. Moreover, by returning to the combustion chamber means 10 the gases which flow downwardly through the zone 15 and by using in the combustion chamber means the preheated combustion air drawn into the furnace through the inlet 4, there is a considerable saving of fuel.

Figure 2:
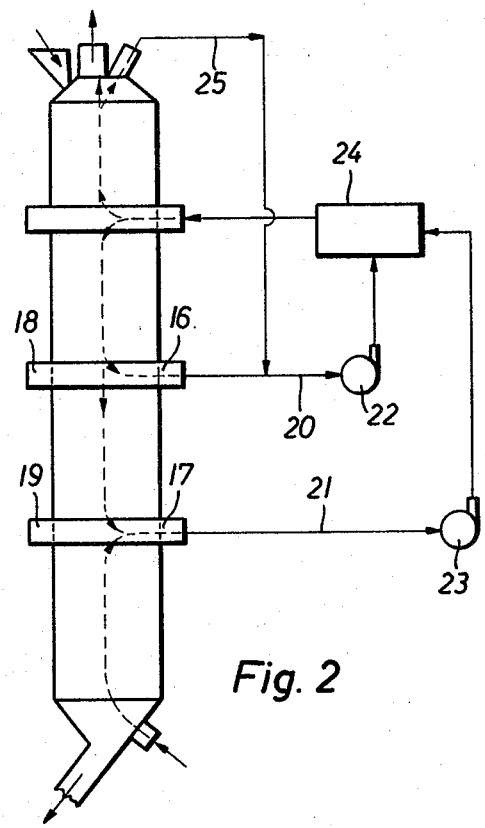
FIG. 2 is a schematic illustration of another possible method and apparatus according to my invention.

As may be seen from FIG. 2, it is possible in accordance with my invention to provide in the wall of the shaft furnace at central and lower regions thereof a pair of gas outlet openings 16 and 17, the openings 16 being distributed circumferentially around the furnace and the openings 17 also being distributed circumferentially around the furnace. A channel 18 covers the openings 16 and forms an enclosure communicating therewith, while a channel 19 covers the openings 17 and forms an enclosure communicating therewith. Thus, with this embodiment of my invention there are a pair of gas outlet regions situated at different elevations of the shaft furnace and from both of which it is possible to withdraw hot gases from the primary calcining zone of the furnace. The interiors of the channels 18 and 19 respectively communicate with return conduits 20 and 21 which in turn coact with blowers 22 and 23, respectively, which serve to return the withdrawn gas to the combustion chamber means 24 into the manner shown schematically in FIG. 2. In this way there is a division of the gas which flows concurrently with the treated material in the primary calcining zone. This latter division of the concurrently flowing gases has the advantage of directing more than half of the total combustion gases delivered to the furnace concurrently with the treated material downwardly along the interior of the furnace. The primary calcining zone can therefore be extended over an even longer region of the furnace with this embodiment, so that the time during which the hot gases act on the limestone can be extended further and the calcining method can be carried out in a particularly favorable manner. The gas outlet of the top end of the furnace communicates with a branch return conduit 25 which communicates with the return conduit means 20 so that through the latter not only is gas derived from the gas outlet 16 returned to the combustion chamber 24 but also gas derived from the branch return conduit 25 is returned to the combustion chamber 24. Through this branch return flow conduit 25 a part (for example approximately one half) of the gas flowing in countercurrent to the downwardly moving material upwardly along the interior of the furnace, after leaving the furnace, is returned to the return conduit 20 so as to mix with the gas withdrawn from the primary calcining zone and introduced into the return conduit 20 through the gas outlets 16. The different sources of gas which thus communicate with the return conduit 20 are preferably mixed together in relative amounts which are predetermined with respect to each other so that the gas mixture will have a temperature of approximately 600° C. This gas mixture is then returned to the combustion chamber means 24 by means of the blower 22.

Figure 3:
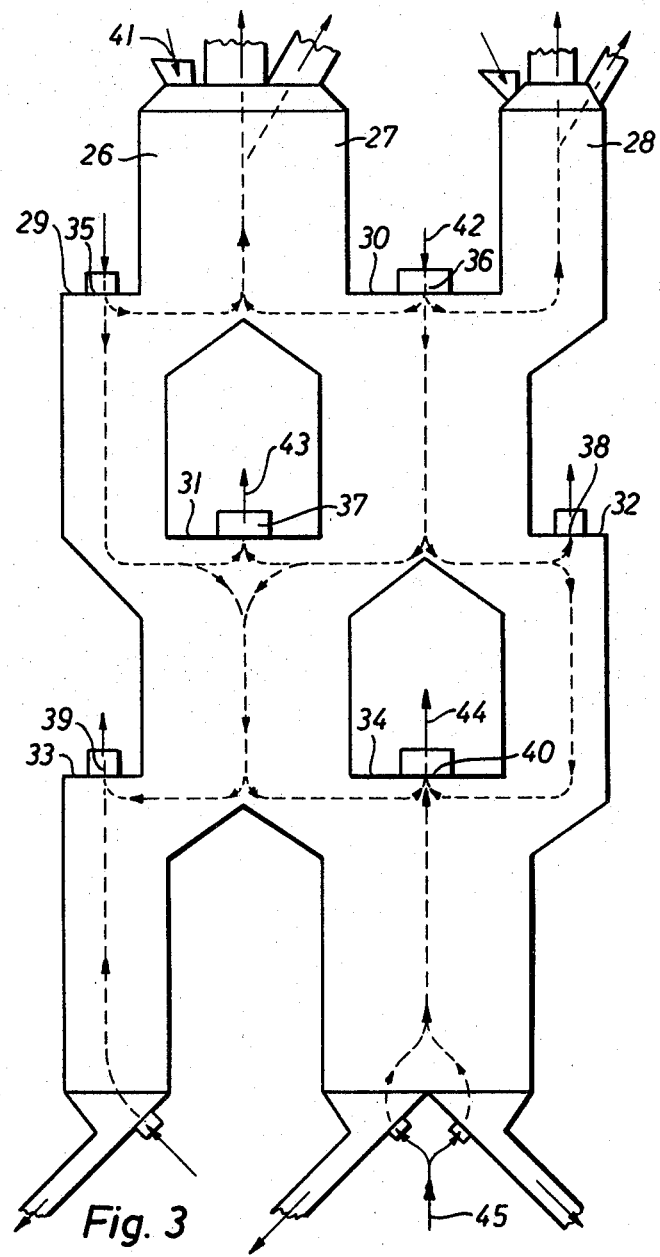
FIG. 3 shows yet another embodiment according to which a plurality of shaft furnaces which form a system of shaft furnaces are combined together in a predetermined manner in accordance with my invention.

In order to carry out the method of my invention, it is of advantage to provide the shaft furnaces with a special construction, according to my invention, as shown schematically in FIG. 3. This construction of my invention involves providing each shaft furnace at predetermined regions with a stepped configuration, this stepped configuration being provided for each furnace at the region of a gas passage through which gas either enters into or is withdrawn from the furnace. This stepped configuration is provided, for example, at the region where the combustion gases are introduced into the furnace and/or at the region where the combustion gases are withdrawn from the furnace, and the stepped configuration provides the furnace with an upper wall portion, at the part provided with the step, so that this upper wall portion can advantageously be provided with the gas passage. In FIG. 3 three shaft furnaces 26, 27 and 28 are combined into a single system of furnaces, and these three furnaces are provided at regions where the hot combustion gases are introduced and withdrawn with steps 29–34 each having an upper wall portion provided with a gas passage, so that the upper wall portions of the steps 29–34 are respectively formed with the gas passages 35–40 through which the hot combustion gases are either introduced into or withdrawn from the furnaces. As a result of the stepped configuration provided for the furnaces of my invention, clogging of the flow of gas through the furnace wall as a result of deposits of the treated material at the gas passages is reliably avoided, and in this way difficulties which might otherwise be encountered in the operation are eliminated. The stepped configuration of the shaft furnaces of my invention also makes it possible, in a highly advantageous manner, to combine a plurality of the shaft furnaces together into a single system. As may be seen from FIG. 3, the adjoining vertical portions of a pair of furnaces which are located next to each other are located directly next to and limit each other in such a way that the adjoining portions communicate at their interiors directly with each other without any intermediate partition walls or the like between the adjoining portions of the pair of furnaces which are next to each other, so that in this way these adjoining furnace portions define a common interior for the pair of furnaces. This results in considerable simplicity in the construction of the entire furnace installation. Moreover, there is the advantage of making it possible for each pair of adjoining furnace portions which communicate with each other to have a common interior, such as the adjoining furnace portions 26 and 27, to have a common inlet end 41 through which the material to be treated is introduced. On the other hand, the pair of adjoining furnaces 27 and 28 have the region below the top ends joined together to form a common interior space, and thus at these adjoining portions of the furnaces 27 and 28 it is possible to provide a common gas inlet 42 through the inlet 36 situated at the step 30. Furthermore, gas can be withdrawn and cool air can be introduced for a pair of adjoining furnaces through common gas passages, as indicated by the arrows 43–45 in FIG. 3. The flow of gas in the furnace installation of FIG. 3, as shown for the entire furnace system in dotted lines and flowing in the direction indicated by the arrows, is in principle the same as that of FIG. 2. All of the gas inlets for the hot combustion gases and gas outlets for the hot combustion gases can in this way be connected to a common combustion chamber means, so that a highly significant simplification of the supervision and operation of the entire installation can be achieved.

Thus, the feature according to my invention of dividing the gas introduced into the furnace into an upwardly flowing portion which flows in countercurrent to the downwardly moving material and a downwardly flowing portion which flows concurrently with the material results in an increase in the time during which the material remains in contact with the hot gases of combustion, so that as a result it becomes possible to operate the furnace of my invention at relatively low temperatures less than approximately 1200° C. in the calcining zone. It thus becomes possible to provide with the method and apparatus of my invention a complete calcining of the limestone while at the same time providing a highly significant increase in the quality of the fired limestone. Moreover, it becomes possible in this way to provide a relatively high yield and a high output.

Inasmuch as the gas which flows concurrently with the material is withdrawn and returned while still at a relatively high temperature to the combustion chamber means, it is only necessary to consume a relatively small amount of fuel in the combustion chamber means in order to heat the gas up to the temperature required for calcining. For the same reason a part of the gas which flows upwardly in countercurrent to the downwardly moving material can, after the leaving the furnace, be returned to the combustion chamber means, as described above in connection with FIG. 2.

As was indicated above, cooling air is introduced into the furnace of my invention through the lower end thereof and is combined with the concurrently flowing hot gases to be delivered therewith to the combustion chamber means. This cooling air which flows upwardly through the lower part of the shaft furnace means of my invention cools the fired limestone to such an extent that without any further cooling it is possible by means of suitable transporting devices to transport the treated material away from the furnace. Furthermore, by using the preheated air as combustion air the consumption of fuel is even further reduced.

I claim:
1. In an installation for firing materials, such as an apparatus for calcining limestone, elongated shaft furnace means having an upper inlet end through which material to be treated is charged into said furnace means and a lower outlet end through which treated material is withdrawn from said furnace means, said furnace means being formed at an upper region but at an elevation lower than said inlet end thereof with a gas inlet and also being formed at an elevation lower than said gas inlet but higher than said outlet end with a gas outlet, combustion chamber means situated at the exterior of said furnace means for providing hot combustion gases, supply conduit means communicating with said combustion chamber means and said gas inlet of said furnace means for supplying hot combustion gases to the interior of said furnace means from said combustion chamber means, return conduit means communicating with said gas outlet of said furnace means and with said combustion chamber means for returning gases from said furnace means to said combustion chamber means, blower means operatively connected with said return conduit means for withdrawing gases from the interior of said furnace means through said gas outlet and for directing the thus-withdrawn gases along said return conduit means back to said combustion chamber means, said shaft furnace means being formed with an additional gas outlet situated below said first-mentioned gas outlet but above said lower outlet end of said furnace means, an additional return conduit means communicating with said additional gas outlet and said combustion chamber means, and an additional blower means coacting with said additional return conduit means for withdrawing gas from the interior of said furnace means through said additional gas outlet and directing the latter gas back to said combustion chamber means along said additional return conduit means.

References Cited

UNITED STATES PATENTS

| | | | |
|---|---|---|---|
| 3,033,545 | 5/1962 | Azbe | 263—29 |
| 3,140,864 | 7/1964 | Lellep | 263—29 |
| 3,285,590 | 11/1966 | Parsons | 263—29 |

FOREIGN PATENTS

| | | |
|---|---|---|
| 933,197 | 9/1955 | Germany. |
| 870,649 | 6/1941 | Great Britain. |

FREDERICK L. MATTESON, JR., *Primary Examiner.*

JOHN J. CAMBY, *Assistant Examiner.*